(12) United States Patent
Lee et al.

(10) Patent No.: US 6,982,527 B2
(45) Date of Patent: Jan. 3, 2006

(54) METHOD FOR DRIVING LIGHT EMITTING DIODE

(75) Inventors: Albert Minru Lee, Taipei (TW); Wei Wen Feng, Taipei (TW)

(73) Assignee: Analog Integrations Corporation, Hsinchu (TW)

( * ) Notice: Subject to any disclaimer, the term of this patent is extended or adjusted under 35 U.S.C. 154(b) by 59 days.

(21) Appl. No.: 10/844,956

(22) Filed: May 12, 2004

(65) Prior Publication Data

US 2005/0023992 A1 Feb. 3, 2005

(30) Foreign Application Priority Data

Jul. 17, 2003 (TW) ................. 92119602 A

(51) Int. Cl.
*H05B 37/02* (2006.01)

(52) U.S. Cl. ............ 315/224; 315/291; 315/169.1; 345/46; 345/212; 323/315

(58) Field of Classification Search ............ 315/169.1, 315/169.3, 224, 291, 209 R; 323/315, 312, 323/313, 317; 327/108, 109, 403, 536, 538; 345/46, 82, 212

See application file for complete search history.

(56) References Cited

U.S. PATENT DOCUMENTS

| | | | | |
|---|---|---|---|---|
| 5,701,133 A | * | 12/1997 | Miller et al. ............ | 345/46 |
| 6,044,095 A | * | 3/2000 | Asano et al. ............ | 372/31 |
| 6,255,868 B1 | * | 7/2001 | Yasuda .................. | 327/108 |
| 6,897,709 B2 | * | 5/2005 | Henry .................... | 327/536 |
| 6,897,717 B1 | * | 5/2005 | Eddleman et al. ...... | 327/543 |

FOREIGN PATENT DOCUMENTS

| | | | |
|---|---|---|---|
| JP | 2002-237745 | * | 9/1998 |
| JP | 10-242522 | * | 8/2002 |

* cited by examiner

*Primary Examiner*—Haissa Philogene

(57) ABSTRACT

A method for driving a light emitting diode coupled to an output of a current mirror is provided. The method includes providing a control terminal voltage of the current mirror as a reference voltage, increasing a voltage of an input of the current mirror and providing an input of the light emitting diode as a voltage feedback point for keeping a constant voltage difference between the input and the output of the current mirror, and driving the light emitting diode by a voltage at the output of the current mirror.

20 Claims, 5 Drawing Sheets

US 6,982,527 B2

METHOD FOR DRIVING LIGHT EMITTING DIODE

FIELD OF THE INVENTION

This invention relates to a method for driving a light emitting diode, and more particularly to a method for driving a light emitting diode coupled to an output of a current mirror.

BACKGROUND OF THE INVENTION

Referring to FIG. 1, it is shown that a charge pump circuit is conventionally used for a current mirror to drive a light emitting diode (LED). Charges are stored and transmitted depending on the one-way transmission of the diode-connected MOS and the capacitance, and therefore a high voltage is formed and output. The conventional charge pump circuit is formed by connecting several pump circuit units 11 in series. Please refer to FIG. 2. Each pump circuit unit 11 is formed by coupling a first capacitor C22, a first transistor N23, a second capacitor C25 and a second transistor N26, wherein the first transistor N23 is connected to the second transistor N26 to form a common drain, then the common drain is connected to one end of the first capacitor C22 and one end of the second capacitor C25, respectively.

However, there are two drawbacks as follows when a light emitting diode is driven by the conventional charge pump circuit.

1. Referring to FIG. 1, the charges are stored by the capacitor of the charge pump circuit. The maximal efficacy of a secondary charge pump circuit is Vout/(2 Vcc), even Vout/(1.5 Vcc). It means that the efficiency of the charge pumping is determined by the input voltage Vcc. Therefore, the efficiency of the charge pump circuit can not be improved by improving the applied circuits or improving the peripheral elements.

2. Please refer to FIG. 3 illustrating a circuit of a white light emitting diode driven by a current mirror in the prior art. The input voltage of the current mirror constructed by the transistors N31, N32, N33 and N34 is corresponding to the output voltage Vout of the charge pump circuit shown in FIG. 1. Since the current mirror is controlled by the charge pump circuit, wherein Vout is fixed at 5V and the input voltage VF of the white light emitting diode D35 is in a range from 3.1V to 3.8V, excess power loss occurs on the current mirror. It can be illustrateed as the equation (1).

$$P_{LEDLOSS} = I_{LED}(V_{OUT} - V_F) \quad (1)$$

In order to overcome the foresaid drawback of the prior art, the present invention provides a method for driving a light emitting diode with a current mirror.

SUMMARY OF THE INVENTION

It is an aspect of the present invention to provide a method for driving a light emitting diode with a current mirror. When the input voltage of a current mirror is increased and the voltage difference between the input and the output of the current mirror is fixed, the low efficiency of the charge pumping and the excess power loss in the prior art are overcome.

The present invention provides a method for driving a light emitting diode coupled to an output of a current mirror. The method includes steps of providing a control terminal voltage of the current mirror as a reference voltage, increasing a voltage of an input of the current mirror and providing an input of the light emitting diode as a voltage feedback point for keeping a constant voltage difference between the input and the output of the current mirror, and driving the light emitting diode by a voltage at the output of the current mirror.

According to the aspect of the present invention, the method can be used for driving a plurality of light emitting diodes, which are arranged in parallel.

Preferably, the current mirror is formed by coupling a plurality of MOS transistors.

Preferably, the light emitting diode is one of a white light emitting diode and a blue light emitting diode.

Preferably, increasing the voltage of the input of the current mirror is performed by an inductor.

It is another aspect of the present invention to provide a method for driving a light emitting diode coupled to an output of a current mirror, including steps of subtracting an offset voltage from a voltage of the input of the current mirror to obtain a reference voltage, increasing the voltage of the input of the current mirror and providing an input of the light emitting diode as a voltage feedback point for keeping a constant voltage difference between the input and the output of the current mirror, and driving the light emitting diode by a voltage of the output of the current mirror.

In accordance with the aspect of the present invention, the method is used for a plurality of light emitting diodes, which are arranged in parallel.

Preferably, the current mirror is formed by coupling a plurality of MOS transistors.

The light emitting diode can be one of a white light emitting diode and a blue light emitting diode.

Preferably, increasing the voltage of the input of the current mirror is performed by an inductor.

It is another aspect of the present invention to provide a method for driving a plurality of groups of light emitting diodes coupled to an output of a current mirror, wherein the plurality of groups of light emitting diodes are connected in parallel and the light emitting diodes in each group are connected in series. The method includes steps of increasing a voltage of an input of the current mirror to a fixed voltage to obtain a group containing a maximal amount of light emitting diodes, providing a control terminal voltage of the current mirror as a reference voltage, providing an input of the group containing the maximal amount of light emitting diodes as a voltage feedback point and regulating the voltage of the input of the current mirror for keeping a constant voltage difference between the input and the output of the current mirror, and driving the plurality of groups of light emitting diodes by a voltage of the output of the current mirror.

Preferably, the current mirror is formed by coupling a plurality of MOS transistors.

Preferably, the light emitting diodes are white light emitting diodes.

Preferably, the light emitting diodes are blue light emitting diodes.

Preferably, increasing the voltage of the input of the current mirror is performed by an inductor.

It is another aspect of the present invention to provide a method for driving a plurality of groups of light emitting diodes coupled to an output of a current mirror, wherein the plurality of groups of light emitting diodes are connected in parallel and the light emitting diodes in each group are connected in series. The method includes steps of increasing a voltage of an input of the current mirror to a fixed voltage to obtain a group containing a maximal amount of light emitting diodes, subtracting an offset voltage from the voltage of the input of the current mirror to obtain a reference voltage, providing an input of the group containing the maximal amount of light emitting diodes as a voltage feedback point and regulating the voltage of the input of the current mirror for keeping a constant voltage difference between the input and the output of the current mirror, and driving the plurality of groups of light emitting diodes by a voltage of the output of the current mirror.

Preferably, the current mirror is formed by coupling a plurality of MOS transistors.

Preferably, the light emitting diodes are white light emitting diodes.

Preferably, the light emitting diodes are blue light emitting diodes.

Preferably, increasing the voltage of the input of the current mirror is performed by an inductor.

The above aspects and advantages of the present invention will become more readily apparent to those ordinarily skilled in the art after reviewing the following detailed description and accompanying drawings, in which:

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
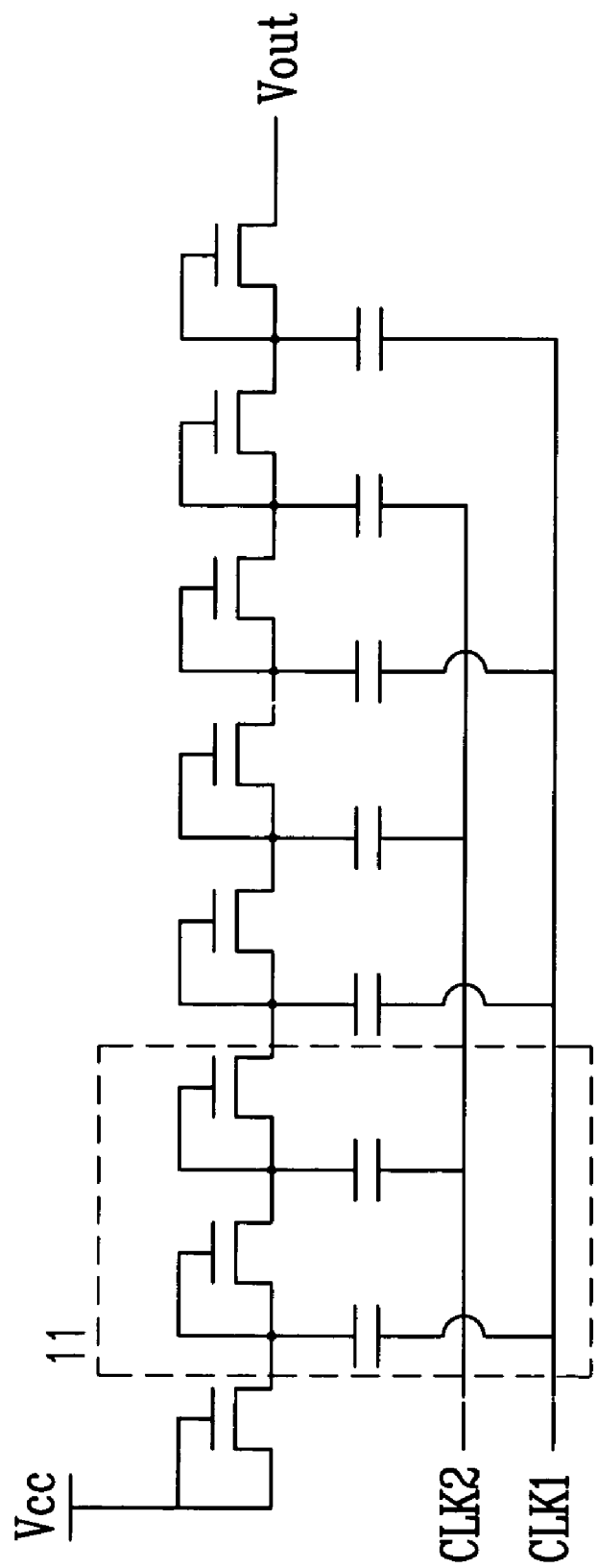
FIG. 1 is a schematic view showing a conventional charge pump circuit.
Figure 2:
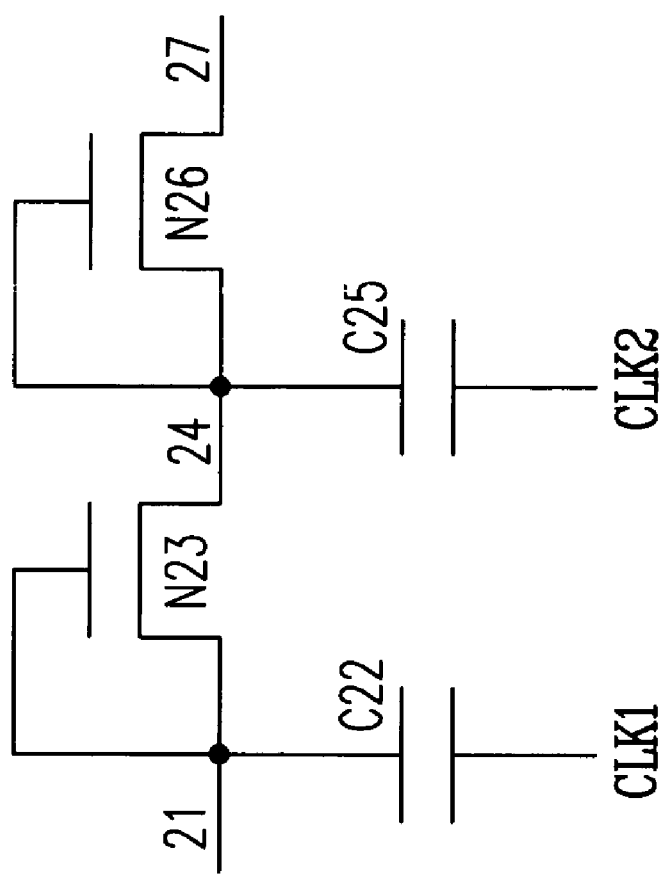
FIG. 2 is a schematic view showing a circuit unit of the conventional charge pump circuit.
Figure 3:
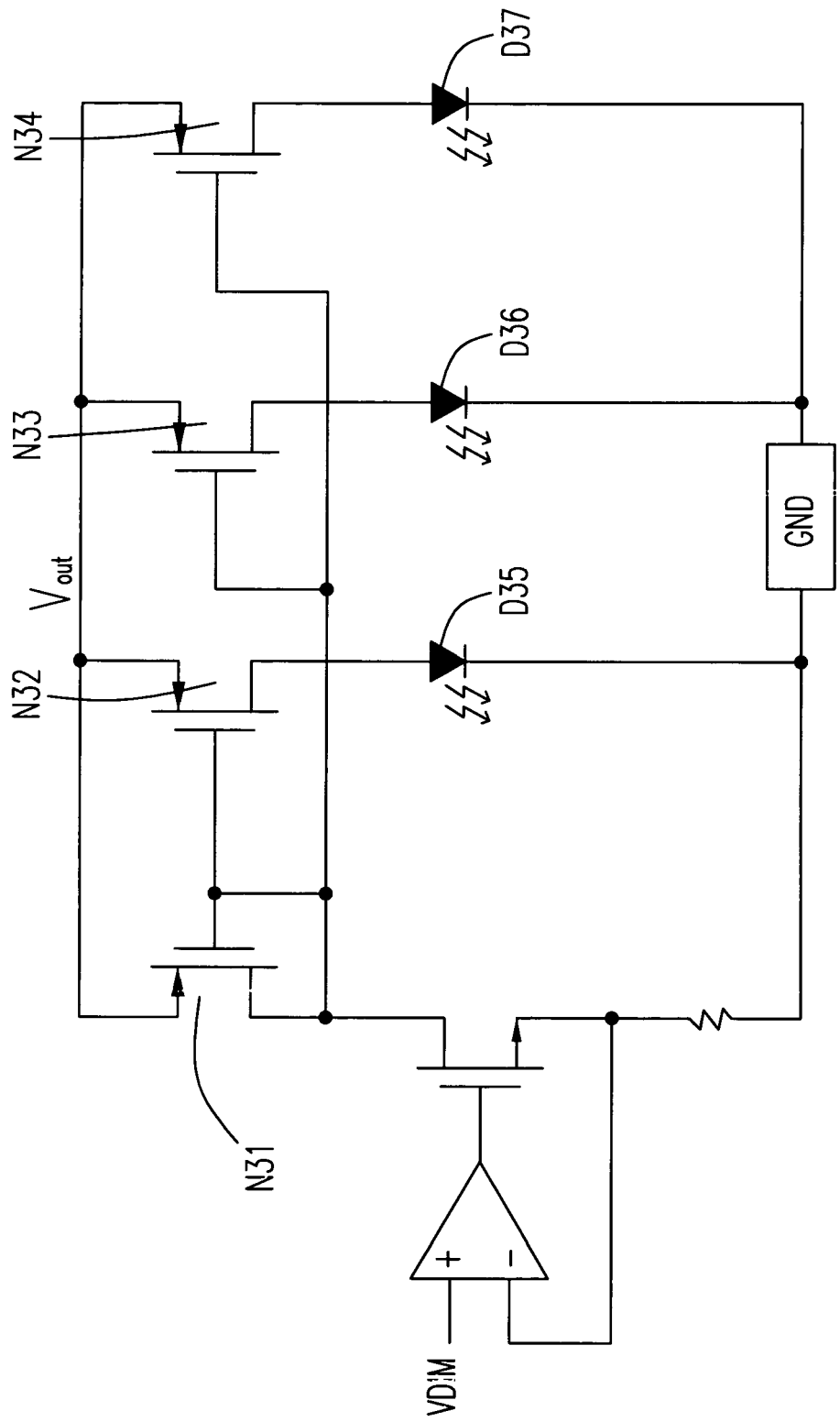
FIG. 3 is a schematic view showing light emitting diodes driven by a current mirror according to the prior art.
Figure 4:
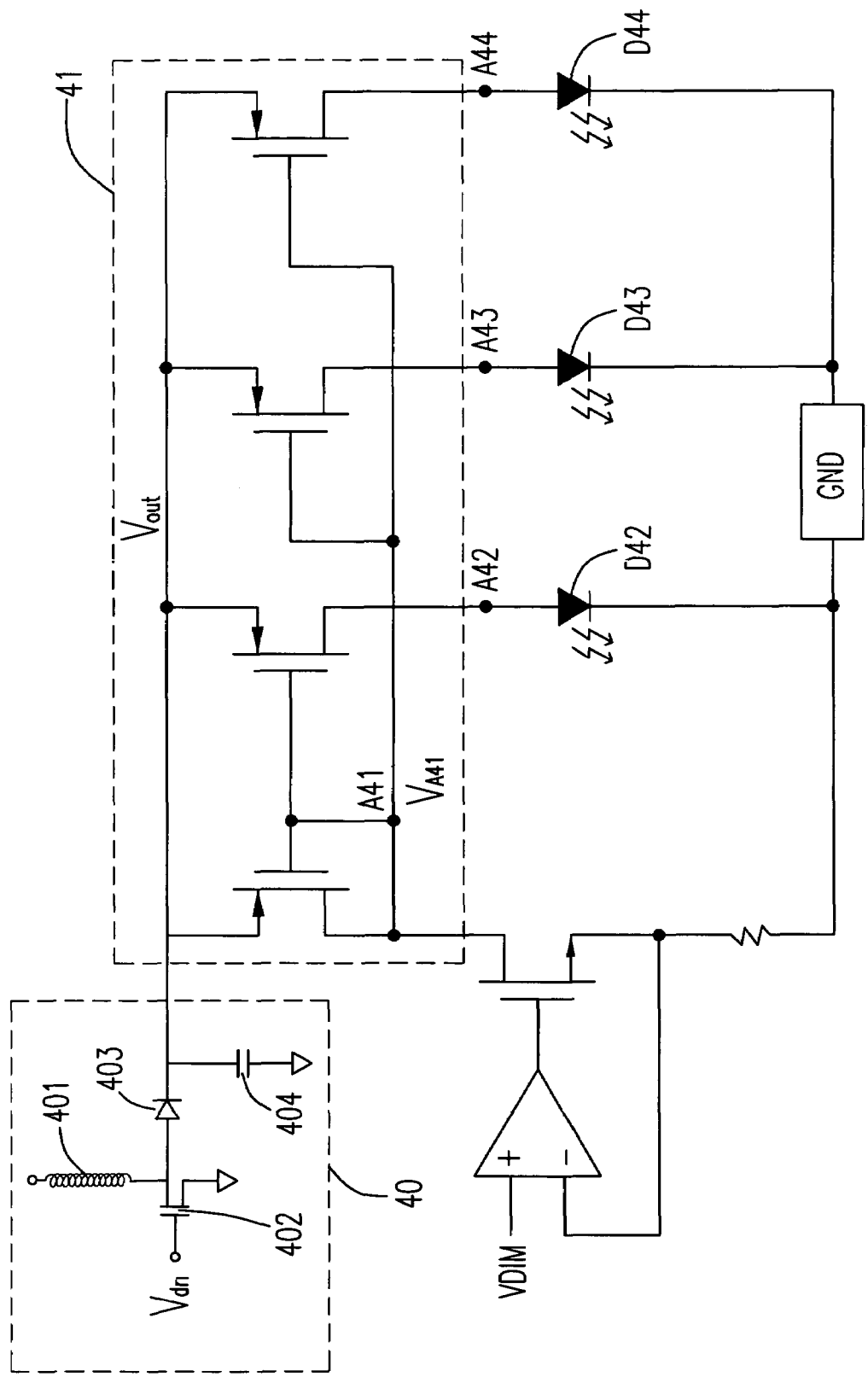
FIG. 4 is a schematic view showing the light emitting diodes driven by a current mirror according to a preferred embodiment of the present invention.

Please refer to FIG. 4 showing a circuit diagram of a light emitting diode driven by a current mirror according to the preferred embodiment of the present invention. The voltage of the input of a current mirror 41 is increased by an inductive charge pumping circuit 40 for driving a plurality of light emitting diodes (LED) coupled to the current mirror 41. The light emitting diodes are not limited to white light, blue light or any other colors of light emitting diodes. For simplifying the descriptions of the present invention, the current mirror 41 constructed by four metal-oxide-semiconductor transistors and three white light emitting diodes arranged in parallel are provided in the preferred embodiment. The way for arranging more light emitting diodes in parallel is understood by one skilled in the art.

As shown in FIG. 4, the inductive charge pumping circuit 40 is formed and coupled by an inductor 401, a metal-oxide-semiconductor transistor 403 and a capacitor 404. Certainly, the inductive charge pumping circuit 40 can be formed in other ways. In comparison with the conventional charge pump circuit having charge pumping with a capacitor, the voltage of the output of the inductive charge pumping circuit 40 is not fixed at a high voltage (5V, for example) when the voltage of the input of the current mirror is increased by the inductive charge pumping circuit 40. It means that the voltage of the input of the current mirror 41 is not fixed at a high voltage. The voltage difference between the voltage Vout of the input and the voltage VA42 of the output of the current mirror 41 is controlled by using the inductive charge pumping circuit 40, and thereby the white light emitting diodes D42, D43 and D44 are driven by the current mirror 41. In accordance with the present invention, a control terminal voltage VA41 of the current mirror 41 is provided as a reference voltage, the voltage Vout of the input of the current mirror 41 is increased by the inductive charge pumping circuit 40, the nodes A42, A43 and A44 of the respective inputs of the white light emitting diodes D42, D43 and D44 are provided as voltage feedback points for keeping a constant voltage difference between Vout and one of VA42, VA43 and VA44, and thereby the light emitting diodes D42, D43 and D44 are driven.

In addition, the reference voltage can be obtained by subtracting an offset voltage from the voltage Vout of the input of the current mirror 41.

In accordance with the present invention, plural light emitting diodes coupled to an output of a current mirror are driven by an inductive charge pumping circuit. Since an inductor-based charge pumping is used, the charge pumping is not limited by the charge pump circuit. Therefore, the efficiency of the charge pumping can be increased in a manner of the synchronous rectification or the synchronous switching with a low resistance.

Since the voltage difference VX between Vou of the output and VA42 of the input of the current mirror 41 is fixed, the power loss on the current mirror 41 is significantly decreased. It is able to be illustrated in the equation (2).

$$P_{LEDLOSS}=I_{LED}VX, \text{ wherein } VX=V_{OUT}-VA42 \qquad (2)$$

In addition, an input voltage of the current mirror can be highly increased by an inductive charge pumping circuit, so that it is not limited that plural white light emitting diodes arranged in parallel are coupled to the output of the current mirror.

Figure 5:
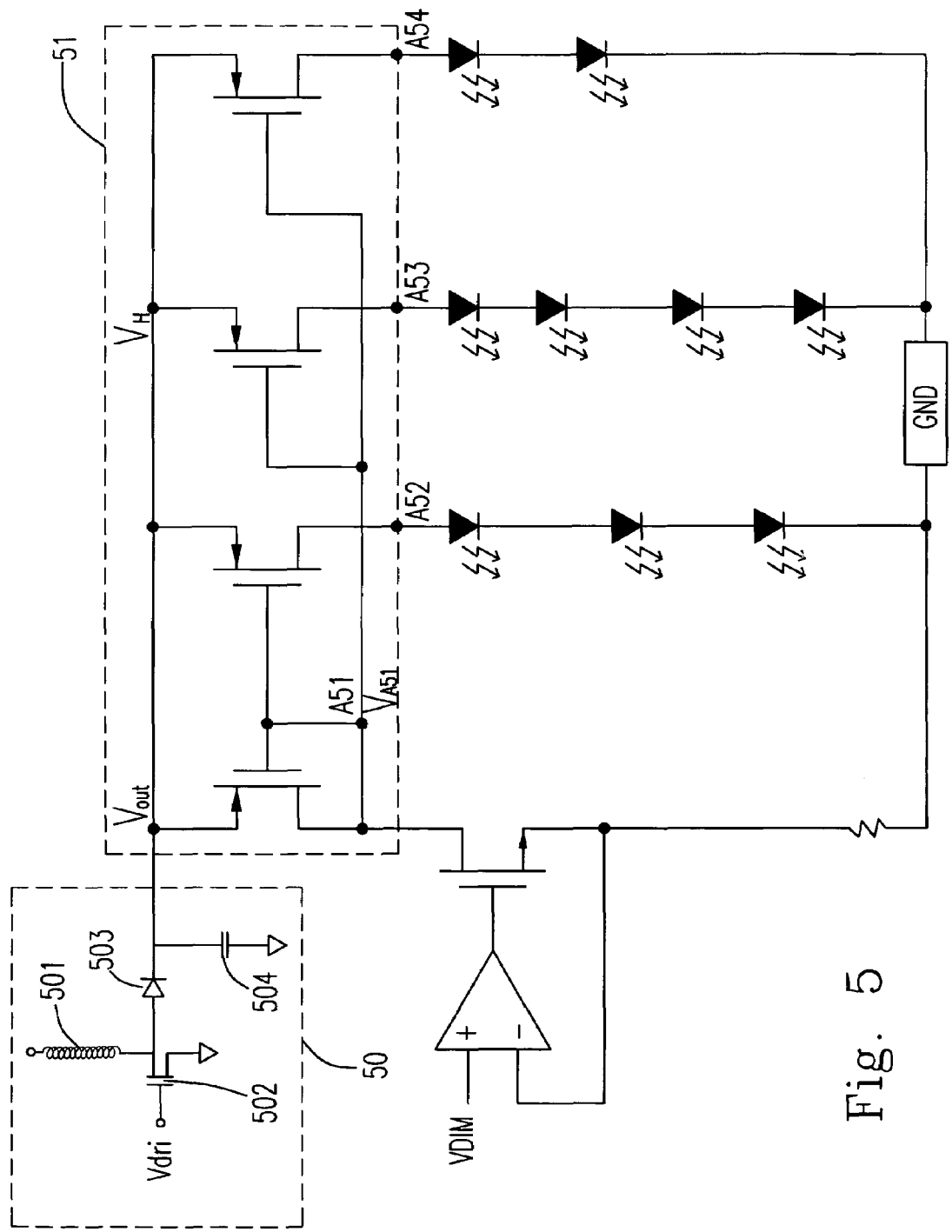
FIG. 5 is a schematic view showing the light emitting diodes driven by a current mirror according to another embodiment of the present invention.

Please refer to FIG. 5 showing light emitting diodes driven by a current mirror according to another preferred embodiment of the present invention. As shown in FIG. 5, the nodes A52, A53 and A54 are respectively connected to plural groups of light emitting diodes in series, wherein the plural groups respectively have different number of light emitting diodes. Some light emitting diodes cannot be turned on when the charge pumping is performed as the foregoing preferred embodiment. Therefore, for the preferred embodiment shown in FIG. 5, a feedback point is identified in advance, i.e. the Vout of the input of the current mirror is increased to a higher and fixed voltage VH by the inductive charge pumping circuit 50, so that a group containing a maximal amount of light emitting diodes is obtained by using the fixed voltage VH. As shown in FIG. 5, the group containing the maximal amount of light emitting diodes is referred as the light emitting diodes connected to the node A53. The input of the obtained group of light emitting diodes is provided as a voltage feedback point, and the voltage of the input of the current mirror is regulated for keeping a constant voltage difference between VH and VA53, and thereby the light emitting diodes respectively connected to the nodes A52, A53 and A54 are driven.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for driving a light emitting diode coupled to an output of a current mirror, comprising steps of:
    providing a control terminal voltage of said current mirror as a reference voltage;
    increasing a voltage of an input of said current mirror and providing an input of said light emitting diode as a voltage feedback point for keeping a constant voltage difference between said input and said output of said current mirror; and
    driving said light emitting diode by a voltage at said output of said current mirror.

2. The method according to claim 1 used for driving a plurality of light emitting diodes, which are arranged in parallel.

3. The method according to claim 1, wherein said current mirror is formed by coupling a plurality of MOS transistors.

4. The method according to claim 1, wherein said light emitting diode is one of a white light emitting diode and a blue light emitting diode.

5. The method according to claim 1, wherein increasing said voltage of said input of said current mirror is performed by an inductor.

6. A method for driving a light emitting diode coupled to an output of a current mirror, comprising steps of:
    subtracting an offset voltage from a voltage of said input of said current mirror to obtain a reference voltage.
    increasing said voltage of said input of said current mirror and providing an input of said light emitting diode as a voltage feedback point for keeping a constant voltage difference between said input and said output of said current mirror; and
    driving said light emitting diode by a voltage of said output of said current mirror.

7. The method according to claim 6 used for a plurality of light emitting diodes, which are arranged in parallel.

8. The method according to claim 6, wherein said current mirror is formed by coupling a plurality of MOS transistors.

9. The method according to claim 6, wherein said light emitting diode is one of a white light emitting diode and a blue light emitting diode.

10. The method according to claim 6, wherein said increasing said voltage of said input of said current mirror is performed by an inductor.

11. A method for driving a plurality of groups of light emitting diodes coupled to an output of a current mirror, wherein said plurality of groups of light emitting diodes are connected in parallel and said light emitting diodes in each group are connected in series, comprising steps of:
    increasing a voltage of an input of said current mirror to a fixed voltage to obtain a group containing a maximal amount of light emitting diodes;
    providing a control terminal voltage of said current mirror as a reference voltage;
    providing an input of said group containing said maximal amount of light emitting diodes as a voltage feedback point and regulating said voltage of said input of said current mirror for keeping a constant voltage difference between said input and said output of said current mirror; and
    driving said plurality of groups of light emitting diodes by a voltage of said output of said current mirror.

12. The method according to claim 11, wherein said current mirror is formed by coupling a plurality of MOS transistors.

13. The method according to claim 11, wherein said light emitting diodes are white light emitting diodes.

14. The method according to claim 11, wherein said light emitting diodes are blue light emitting diodes.

15. The method according to claim 11, wherein increasing said voltage of said input of said current mirror is performed by an inductor.

16. A method for driving a plurality of groups of light emitting diodes coupled to an output of a current mirror, wherein said plurality of groups of light emitting diodes are connected in parallel and said light emitting diodes in each group are connected in series, comprising steps of:
    increasing a voltage of an input of said current mirror to a fixed voltage to obtain a group containing a maximal amount of light emitting diodes
    subtracting an offset voltage from said voltage of said input of said current mirror to obtain a reference voltage;
    providing an input of said group containing said maximal amount of light emitting diodes as a voltage feedback point and regulating said voltage of said input of said current mirror for keeping a constant voltage difference between said input and said output of said current mirror; and
    driving said plurality of groups of light emitting diodes by a voltage of said output of said current mirror.

17. The method according to claim 16, wherein said current mirror is formed by coupling a plurality of MOS transistors.

18. The method according to claim 16, wherein said light emitting diodes are white light emitting diodes.

19. The method according to claim 16, wherein said light emitting diodes are blue light emitting diodes.

20. The method according to claim 16, wherein increasing said voltage of said input of said current mirror is performed by an inductor.

* * * * *